United States Patent Office 2,721,859
Patented Oct. 25, 1955

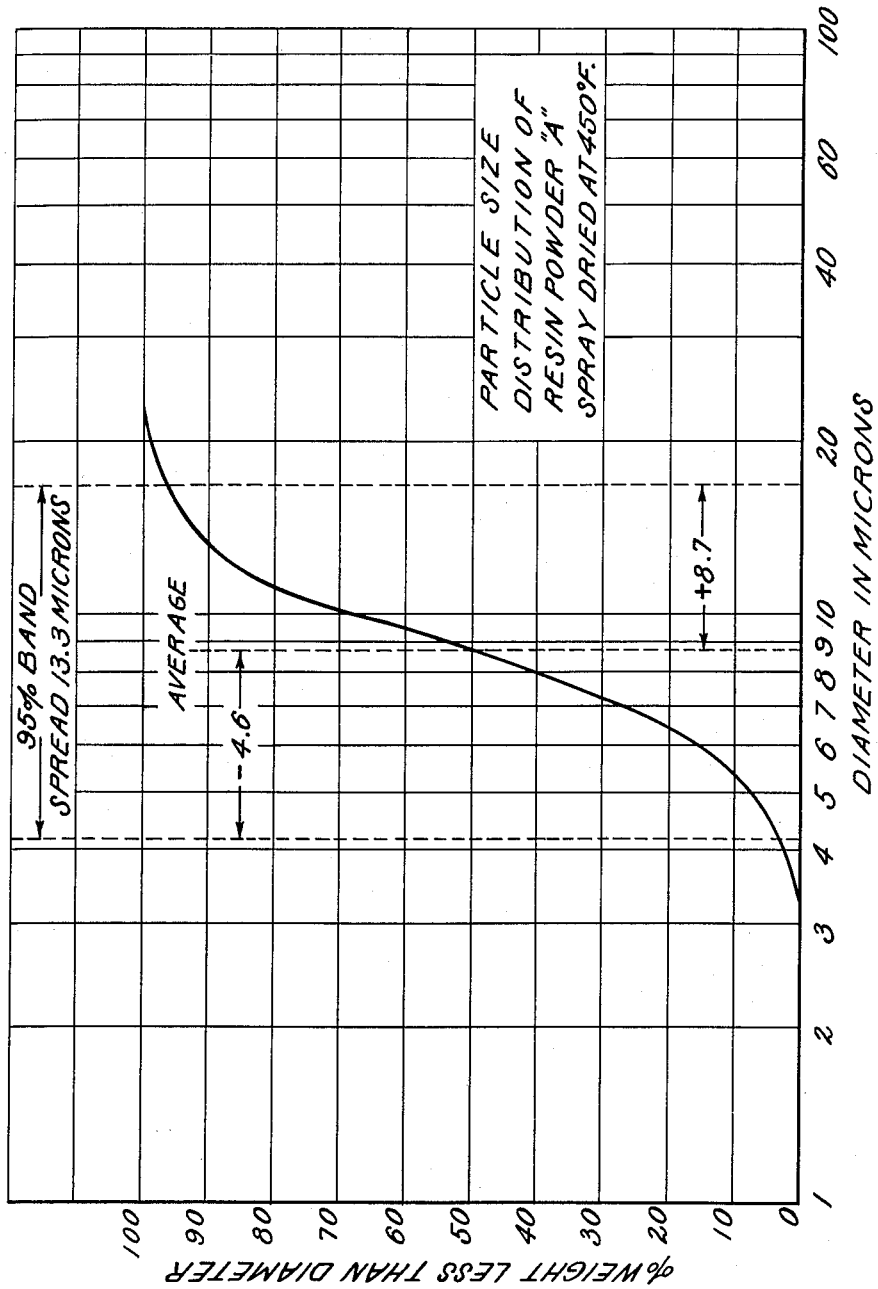

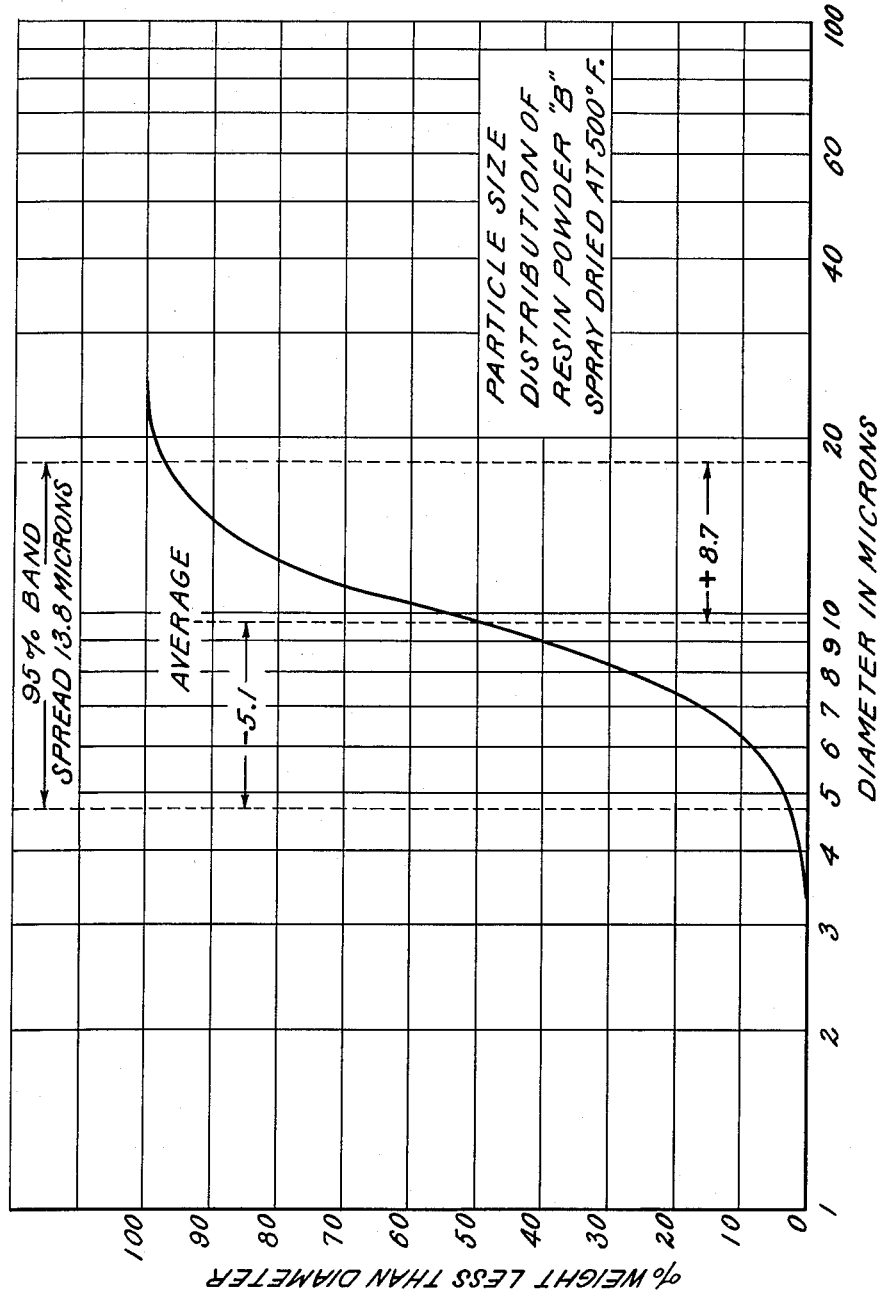

2,721,859

SPRAY-DRYING PROCESS FOR MAKING PLASTISOL GRADE VINYL CHLORIDE POLYMERS

Albert W. Fuhrman, Naugatuck, Conn., assignor to United States Rubber Company, New York, N. Y., a corporation of New Jersey Application August 16, 1954, Serial No. 450,110

3 Claims. (Cl. 260—92.8)

This invention relates to vinyl chloride polymers suitable for use in plastisols, and more particularly it relates to a method of producing from polyvinyl chloride latex an improved dry powdered resin capable of yielding a plastisol of desirably low viscosity.

In the accompanying drawings:

Fig. 1 is a graphical representation, on a semi-logarithmic plot, of the particle size distribution of an individual polyvinyl chloride resin powder processed in accordance with the invention; and, Fig. 2 is a similar plot of a second such powder.

The term "plastisol" is well-known in the art and refers to a fluid suspension of a solid particulate resin in a nonvolatile liquid plasticizer which is a poor solvent for the resin at ordinary temperatures, but which dissolves the resin at elevated temperatures, thereby forming a solid gel in which the resin and plasticizer remain completely compatible on cooling. In practice, the plastisol is given a desired shape by such procedures as molding, casting, dipping, extruding, coating and the like. The thus-shaped plastisol is heated and thereafter cooled to produce the final article. In actual practice, the polyvinyl chloride resin employed in the plastisol frequently contains, copolymerized with the vinyl chloride, a small amount of an additional copolymerizable mono-ethylenically unsaturated material, such as vinyl acetate, and the present invention is equally applicable to such modified forms of polyvinyl chloride. The references to vinyl chloride resin or polymer or polyvinyl chloride herein include such modified forms of the plastic.

Polyvinyl chloride plastisols are used particularly in the preparation of dipped goods, molded articles, films and coatings. The weight ratio of the resin polymer to plasticizer in the plastisol is generally from 50:50 to 65:35. It is desirable that the plastisol be quite fluid at ordinary temperatures, in order to facilitate mixing and handling of the plastisol. As the amount of polymer in the plasticizer is increased, the plastisol becomes less fluid, but the rigidity of articles made from the plastisol increases. Generally, as much polymer is used as is possible without making the plastisol too viscous. It will be apparent that the requirements for high polymer content and accompanying low viscosity in the plastisol are contradictory. It is a principal object of the present invention to prepare a powered resin polymer that is capable of producing a plastisol of lower viscosity than would otherwise be possible, while still retaining a desirably high resin content in the plastisol.

According to the present invention, vinyl chloride polymer latex is spray dried in separate portions under distinctly different spray drying conditions. The spray dried product is mechanically ground to provide a homogeneous fine powder. It has been found, unexpectedly, that when a plurality of such powders are mixed together and compounded with a plasticizer to form a plastisol, such resulting plastisol has a decidedly lower viscosity than the appropriately weighted average of plastisols obtained from any of the powders alone.

The invention is typically practiced with polyvinyl chloride resin latex in which the resin particles in the latex have an average diameter in the range of 0.02 to 2 microns, preferably in the range from 0.4 to 0.8 micron. The average particle diameter of a latex as referred to in this usage is the average diameter of the dispersed particles as determined by electron microscope measurements on the latex. Such relatively large size vinyl chloride resin latex may be prepared by polymerizing the vinyl chloride in the presence of a small amount of a previously prepared polyvinyl chloride "seed" latex (British Patent 627,265), or by initially polymerizing the vinyl chloride emulsion, with or without a seed latex, in the presence of a portion only of the emulsifying agent desired in the final polymer latex and after partial polymerization adding further emulsifying agent and completing the polymerization (British Patents 630,611 and 634,647). The vinyl chloride polymerizations are usually carried out at temperatures from 40° C. to 60° C. in the presence of conventional peroxygen catalysts, such as hydrogen peroxide or persalts, e. g., alkali persulfates, alkali perborates or alkali percarbonates. The emulsifying agent for the emulsion polymerization typically may be a conventional anionic surface-active agent, as usually used in vinyl chloride polymerization, e. g., soaps of long chain fatty acids, long chain alkyl sulfates and sulfonates, sulfated and sulfonated ethers of long and short chain aliphatic groups, sulfonated alkyl esters and sulfonated glycol esters of long chain fatty acids, alkylated aryl sulfonates, and alkyl sulfosuccinates.

For purposes of the invention a plurality of portions (e. g. two, three, or even more portions, but typically only two portions) of polyvinyl chloride latex are spray dried separately in any conventional spray drier, such as described in Perry's Chemical Engineers Handbook, 3rd edition, pp. 838–846, published by McGraw-Hill, New York (1950). The latex portions are typically portions of the same latex, prepared as a single batch which is divided to provide the separate portions, or prepared as a plurality of batches made according to essentially the same polymerization procedure or recipe, each such batch providing the desired separate portion of latex. Although the separate latex portions may also be provided by preparing separate batches of latex according to different polymerization procedures or recipes, it is not necessary to do so, and it is preferred not to do so because of the complication of factory operations attendant upon utilizing different polymerization procedures in different batches. The separate latex portions are spray dried at distinctly different spray drying temperatures. The minimum spray drying temperature is generally at least 200° F., and preferably the spray drying temperature is somewhat higher than this, within the range 225–500° F., and temperatures higher than 500° F. may even be employed, e. g., temperatures of 550° F., although temperatures high enough to decompose the resin are of course to be avoided. For purposes of the invention it is essential that the different latex portions be spray dried at substantially different temperatures, that is, the spray drying temperatures for the different portions should differ by at least 10° F., and preferably by at least 25–50° F.

The thus-obtained spray dried agglomerates are then ground in a conventional grinding mill or pulverizer or disintegrator (generally called grinders, see Chemical Engineers Handbook, supra, page 1116) to an average particle diameter in the range of 5 to 15 microns as observed by an air sedimentation method to be described below. Such conventional grinders are shown in the article by C. E. Berry, "Modern machines for size reduction in fine size range," in Ind. Eng. Chem., 38, 672–678 (1946).

It is a characteristic of the distinct polyvinyl chloride resin powders, prepared as described for instance in the working examples below, that they each have a broad particle size distribution, that is, the particle sizes are spread out considerably over a wide range on each side of the average particle size. In general, it may be stated that the separately spray dried powders have a particle size distribution such that 95% of the material is spread out over a range of at least ±4 microns on each side of the average. The spread of the particle sizes within any one of the powders is usually even greater than this, and may be such that a range of ±5 or 10 or even more microns on each side of the average is necessary to embrace 95% of the material. It will be appreciated that this particle size distribution of individual spray dried powders is indeed extremely broad, in view of the fact that some polyvinyl chloride particles have previously been described as having such narrow distribution that 95% of the material falls within ±0.05 micron of the average. Stated in another way 95% of each of the powders is spread out over a band, extending on each side of the average, having a total width of at least 8 microns, and preferably 10 or 20 microns.

The particle size distribution of the resin powder, and the average particle size of the powder, as referred to herein, are conveniently determined by the air sedimentation method. Figs. 1 and 2 are plots of particle size distribution curves so obtained, on two separately spray dried portions of polyvinyl chloride latex (after finely grinding the dried powders) as will be explained in more detail below. The particular procedure for making the measurements on which these graphs are based is known as the Sharples micromerographic method, and is described in "Food Engineering" for December 1953, page 71, and U. S. Patents 2,597,899 and 2,628,787. This method involves confining a sample of the powder under pressure with nitrogen gas, and suddenly releasing the powder in such manner that the powder is dispersed throughout the atmosphere of a long chamber. The thus-dispersed particles gradually settle, and the weight of the powder falling in a given time interval is recorded. Particles falling at the same rate of speed are assumed to be of equal size. By means of a previous calibration made with particles of known diameter, the weight of the sample falling in a given time may readily be correlated with particle diameter. The data are suitably plotted as particle size, in microns, on a logarithmic scale on the horizontal axis versus amount of the powder, in weight-percent, under such size on an arithmetic scale on the vertical axis, as shown in Figs. 1 and 2. The average particle size of the powder is of course recognizable directly on such a plot as the size in microns of the particles below which 50% of the powder is found. The particle size distribution is conveniently expressed, in the manner given above, as the range of particle sizes, in microns, over which a stated percentage of the powder is spread. Thus, if the particle size distribution is narrow, the foregoing plot will be quite steep, that is, it will rise sharply vertically, and the bulk of the powder will be found within a very narrow band on either side of the average. On the other hand, if the particle size distribution is broad, the curve will have a more gentle slope, that is, it will be inclined more to the horizontal, and a wide band of size ranges will be necessary to embrace the bulk of the powder. In practice, such plots do not usually actually represent the entire bulk of the powder, since an impractically long time is required for the last percent or so of extremely fine powder to settle. However, for practical purposes, the graphs may be taken as representing the analysis of essentially the total quantity of the powder.

In addition to having a wide particle size distribution, as described, the separately spray dried resin powders prepared for example as described below are also characterized by the fact that they typically have essentially identical average particle sizes. Thus, the separately spray dried powders typically do not vary in average particle size by more than a few percent and the ratio of the average particle sizes of the separate powders in ordinary practice is not observed to exceed 1:1.3; in fact, the ratio is almost invariably considerably less than this.

To prepare the plastisol, the separately spray dried powders are mixed in any desired ratio, along with conventional amounts of a suitable plasticizer. Usually the ratio of the separate powders is within the range of 80:20 to 20:80, while the best results are realized when operating in the range of 75:25 to 25:75. Stated in another way the mixed powder contains at least 20%, and preferably at least 25%, of any one powder. The powders may be mixed with each other prior to blending with the plasticizer, or each powder may be mixed separately with a portion of the plasticizer to form two plastisols which are thereafter intermingled, or one powder may be mixed with required amount of plasticizer, after which the second powder is added. In the last two procedures it will be noted that one or both of the powders is already suspended in the liquid at the time that the powders become mixed together. If desired, the separately spray dried powders may be mixed prior to the grinding operation described above. Among the various conventional plasticizers employed in making plastisols there may be mentioned the dialkyl phthalates, e. g., di(2-ethyl hexyl phthalate), trialkyl phosphates, e. g., trioctyl phosphates; triaryl phosphates, e. g., tricresyl phosphate, dialkyl sebacates, e. g., dihexyl sebacates; dialkyl adipates, e. g., dioctyl adipate.

The following examples, in which all parts and percentages are expressed by weight, will serve to illustrate various aspects of the invention in further detail.

*Example 1*

A polyvinyl chloride latex having an average particle size of approximately 0.5 micron, and prepared by the seed method described in the reference mentioned above, was creamed to a solids content of 42%. The latex was separated into two portions, designated A and B, and each portion was spray dried separately in a Bowen laboratory spray drier under the following conditions:

| Latex Portion | Spray Drying Temperature (Inlet), ° F. |
|---|---|
| A | 450 |
| B | 500 |

Each of the thus separately dried resins was then ground individually in an impact grinder (No. 5 Mikro-Atomizer made by Pulverizing Machinery Company, Summit, N. J., described in the Berry article in Ind. Eng. Chem. above referred).

Sharples micromerographic particle size analyses were made, as previously described, on each of the resulting spray dried powders, with the results shown in Figs. 1 and 2. It will be apparent from inspection of the drawing that each of the powders had a broad particle size distribution, and essentially the same average particle size, and, in fact, the powders are so similar with respect to particle size characteristics that their respective analysis curves are virtually superimposable. The average particle size of powder A is 8.8, and 95% of the material in this powder is spread out over a range extending from +8.7 microns above the average to −4.6 microns below the average. Such figures are discerned from the graph in Fig. 1 by noting the readings in microns at the extremes of a band embracing 95% of the material, that is a band which has 2.5% as its lower limit and 97.5% as its upper limit. In other words, the 95% band is determined by excluding 5%, made up of 2.5% of the material on the low side and 2.5% on the high side (i. e. the 2.5% lying above the selected upper limit of 97.5%). The reading in microns at the high limit is about 17.5 microns, while the corresponding reading at the low limit is about 4.2 microns. Taking the difference between the average value (i. e., 8.8 microns at the 50% level), one sees that the 95% band takes in a range from 8.7 (i. e. the high 17.5 minus the average 8.8) above the average on the high side to 4.6 (i. e. the average 8.8 minus the low 4.2) below the average on the low side. The entire spread of the 95% band amounts to about 13.3 microns.

In the same manner it will be observed in Fig. 2 that powder B has virtually the same average particle size, specifically, 9.8 microns (i. e., the value at the 50% mark), and 95% of the material in this powder is spread out over a range extending from +8.7 above the average to —5.1 below the average. The entire spread of the 95% band amounts to about 13.8 microns.

The ratio of the average particle sizes of the powders A and B is very low, i. e., 1:1.1. This, together with the respective values of 13.3 and 13.8 microns for the widths of the 95% bands in the two powders, points to the essential similarity of the particle size characteristics of the two powders.

Plastisols were then prepared by mixing 40 parts of dioctyl phthalate with 60 parts of resin powder, such resin powder being composed of the individual separately dried powders A and B and powders A and B mixed in various proportions as indicated in the table below. After 24 hours the viscosities of the resulting plastisols were then measured at 25° C. on a Brookfield viscosimeter with a No. 7 spindle rotating at 20 R. P. M., with the following results:

| Resin | Plastisol Viscosities, Centipoises |
|---|---|
| A | 10,000 |
| B | 11,000 |
| 25% A, 75% B | 9,000 |
| 50% A, 50% B | 7,000 |
| 75% A, 25% B | 9,000 |

It will be apparent from the foregoing data that the mixed separately spray dried powders produced a plastisol of appreciably lower viscosity than that obtainable from either powder separately, at the same solids content. It is also apparent that the viscosity of any one mix is not merely an additive value of the component viscosities, because in that event the viscosity should lie between the viscosities obtained with each powder separately.

*Example 2*

A creamed polyvinyl chloride latex having a particle size of approximately 0.5 micron and a total solids content of 40% was divided into two parts processed as in Example 1 by spray drying separate portions thereof under the following conditions, to yield separate powders designated C and D:

| Latex Portion | Spray Drying Temperature (Inlet), ° F. |
|---|---|
| C | 450 |
| D | 500 |

After grinding, the two powders C and D had only minor differences in average particle size, and the particle size distribution was broad and virtually identical in each case. Plastisols were then prepared as in Example 1, and viscosities determined after two hours and twenty-four hours, with the following results:

| Resin | Plastisol Viscosities, Centipoises | |
|---|---|---|
| | Two Hours | Twenty-four Hours |
| C | 11,500 | 15,500 |
| D | 12,000 | 13,500 |
| 25% C, 75% D | 11,000 | 13,000 |
| 50% C, 50% D | 6,000 | 7,000 |
| 75% C, 25% D | 10,000 | 11,000 |

*Example 3*

A plastisol was prepared from 40 parts of dioctyl phthalate and 60 parts of a mixed resin powder made up of equal quantities of each of the four separately dried powders A, B, C and D. The viscosity was 5,000 centipoises after two hours, and 6,000 centipoises after twenty-four hours.

It will be apparent from the foregoing that the invention provides a convenient and economical method for processing polyvinyl chloride latex in such manner as to provide resin powders capable of yielding plastisols of appreciably lower viscosity than would be possible with the same resin obtained from the latex in the conventional manner. Therefore, it is possible by means of the invention to maintain a desirably high level of resin concentration in the plastisol without encountering difficulties occasioned by unduly high viscosity.

The invention does not require preparation of a plurality of different kinds of polyvinyl chloride latex, but can be practiced conveniently and to best advantage simply by separately processing latex portions made by a given polymerization procedure, by spray drying such portions at different temperatures, and thereafter fine grinding, as described.

While it does not appear to be possible at the present time to advance any plausible theory of operation of the invention that is consistent with the available particle size data, it will be appreciated that the practice of the invention is independent of any particular theory of operation, and to that extent it is unnecessary to know the exact ultimate mechanism by which the present procedure produces the lowering of the viscosity. The observed fact is that the finely ground powders, spray dried at different temperatures as described, produce when blended a definite lowering of the viscosity.

The method of making a plastisol grade resin by spray drying the latex and finely grinding is disclosed and claimed in co-pending application Serial No. 408,297 of M. H. Danzig et al., filed February 4, 1954.

Having thus described my invention, what I claim and desire to protect by Letters Patent is:

1. A method of making a plastisol grade of vinyl chloride resin comprising separately spray drying separate portions of vinyl chloride resin latex at different temperatures within the range of from 200° to 550° F., the said difference amounting to at least 10° F., finely grinding the dried materials to an average particle size within the range of from 5 to 15 microns, and mixing the materials, the quantity of each powder in the mixture amounting to at least 20% of the mixture.

2. A method of making a plastisol grade of vinyl chloride resin comprising the steps of separately spray drying separate portions of vinyl chloride resin latex at different temperatures within the range from 200° to 500° F., the said difference amounting to 25°–50° F., finely grinding the spray dried material to an average particle size within the range of from 5 to 15 microns, each spray dried powder having a broad particle size distribution such that 95% of the particles are spread out over a range having a width of from 8 to 20 microns, and mixing the said spray dried powders, the quantity of each powder in the mixture amounting to at least 25% of the mixture.

3. A method of preparing polyvinyl chloride polymer in particulate form suitable for preparing plastisols of decreased viscosity, comprising in combination the steps of providing a polyvinyl chloride latex in which the polymer particles have an average particle size within the range of from 0.4 to 0.8 micron, dividing the said latex into two separate portions, separately spray drying the said latex portions at two different temperatures within the range 225°–500° F., said temperatures differing from each other by at least 25° F., thereafter finely grinding the resulting dry materials to produce powders having an average particle size of from 5 to 15 microns, each of said powders having substantially the same average particle size and each of said powders having a broad particle size distribution such that 95% of each powder is spread out over a range of particle sizes extending ±5 to 10 microns on each side of the said average, and uniformly blending the two said powders in ratio of from 75:25 to 25:75.

References Cited in the file of this patent
UNITED STATES PATENTS

| | | |
|---|---|---|
| 2,187,877 | Ferris et al. | Jan. 23, 1940 |
| 2,553,916 | Halbig | May 22, 1951 |